United States Patent Office 3,155,643
Patented Nov. 3, 1964

3,155,643
POLYMERIZATION PROCESS
Cecil Edwin Henry Bawn, Prenton, Birkenhead, England, and Michael Raymond Clarke, Kew, Melbourne, Victoria, Australia, assignors to Monsanto Chemicals Limited, London, England, a British company
No Drawing. Filed Aug. 7, 1961, Ser. No. 129,504
Claims priority, application Great Britain, Aug. 7, 1958, 25,316/58
10 Claims. (Cl. 260—94.9)

This application is a continuation-in-part of our co-pending application S.N. 828,686, filed July 22, 1959, and now abandoned.

The invention relates to the preparation of solid polymers of certain ethylenically-unsaturated hydrocarbons and more particularly relates to a process for polymerizing the ethylenically-unsaturated hydrocarbons to solid polymers under mild polymerization conditions in contact with a novel catalyst system.

"Low-pressure" polyethylene and similar polymers have gained considerable interest in recent years because of the advantages (e.g., higher density and consequent greater rigidity) which they have over comparable "high-pressure" polymers. The preparation of the low-pressure polymers has presented a problem in that catalysts conventionally employed in high-pressure polymerization are not effective in catalyzing the low-pressure polymerization of monomers such as ethylene to solid polymers, and the more active catalysts which have been found to be effective in catalyzing the low-pressure polymerization of ethylene leave much to be desired from the standpoint of economics.

An object of the invention is to provide a novel process for polymerizing certain ethylenically-unsaturated hydrocarbons to solid polymers under mild polymerization conditions.

Another object is to provide an economical process for polymerizing certain ethylenically-unsaturated hydrocarbons to solid polymers under mild polymerization conditions in contact with a novel catalyst system.

These and other objects are attained by polymerizing a monomer of the group consisting of ethylene, propylene, butadiene, styrene, and mixtures thereof under mild polymerization conditions in contact with an aluminum halide/inorganic mercuric compound catalyst in an inert liquid medium.

The following examples are given to illustrate the invention and are not intended as a limitation thereof.

Example I

Charge 1.2 grams of finely-divided mercuric chloride and 20 cc. of a 0.0113 N solution of aluminum bromide in cyclohexane (0.06 gram of aluminum bromide) to a 100 cc. round-bottomed flask, evacuate the flask to de-gas the contents, and connect it to an ethylene source so as to admit ethylene at atmospheric pressure. Shake the flask 500 times per minute at 20° C. until no further absorption of ethylene takes place. As the polymerization proceeds, white flocks of solid polyethylene appear suspended in the cyclohexane.

When ethylene absorption has stopped, pour the polymer-containing mixture into 200 cc. of a hydrochloric acid solution obtained by mixing 1 volume of concentrated hydrochloric acid with 9 volumes of ethanol. Stir the mixture of polymer and acid solution together for 3 hours to ensure complete dissolution of the catalyst from the polymer. Then filter off the polymer and dry it under reduced pressure to remove water and traces of organic solvents.

The product is 2.5 grams of a rigid, white polyethylene which melts with decomposition above 300° C.

Example II

Repeat Example I exactly except for substituting 20 cc. of a suspension (.2 gram) of aluminum chloride in cyclohexane for the solution of aluminum bromide in cyclohexane. The product is about 2.5 grams of rigid polyethylene.

Example III

Repeat Example I exactly except for substituting a charge of 2 grams of finely-divided aluminum bromide and 2 grams of finely-divided mercuric chloride suspended in 30 cc. of stannic chloride for the catalyst and liquid medium of that example. The product is 6 grams of rigid polyethylene.

Example IV

Charge 2 grams of finely-divided mercuric bromide and a solution of 0.8 gram of aluminum bromide in 30 cc. of n-decane to a 100 cc. round-bottomed flask, evacuate the flask to de-gas the contents, and connect it to an ethylene source so as to admit ethylene at atmospheric pressure. Shake the flask 100 times per minute at 20° C. until no further absorption of ethylene takes place. Then recover the polymer as in Example I.

The product is 5 grams of solid polyethylene. The polymer appears to have rubbery properties, is soluble in organic solvents, and merely becomes tacky rather than melting even at temperatures above 200° C.

Example V

Repeat Example IV exactly except for substituting a charge of 2 grams of finely-divided mercuric cyanide and a solution of 0.2 gram of aluminum bromide in 30 cc. of carbon tetrachloride for the catalyst and liquid medium of that example. The product is 5 grams of pure white, solid polyethylene.

Example VI

Repeat Example IV exactly except for substituting a charge of 2 grams of finely-divided mercuric nitrate and a solution of 0.8 gram of aluminum bromide in 30 cc. of cyclohexane for the catalyst and liquid medium of that example. The product is 1.5 grams of solid polyethylene.

Example VII

Repeat Example IV exactly except for substituting 2 grams of finely-divided mercuric oxide for the 2 grams of mercuric bromide. The product is 6 grams of solid polyethylene.

Example VIII

Charge 2 grams of finely-divided mercuric chloride and a solution of 1 gram of aluminum bromide in 50 cc. of cyclohexane to a 100 cc. round-bottomed flask, evacuate the flask to de-gas the contents, and connect it to a monomer source so as to admit an ethylene-propylene mixture (43.5 mol percent propylene) at atmospheric pressure. Allow polymerization to proceed with agitation at 20° C. and then isolate the polymer as in Example I.

The product is 5 grams of solid ethylene-propylene copolymer.

Example IX

Repeat Example I exactly except for connecting the flask to a butadiene source rather than an ethylene source. The product is 4 grams of solid polybutadiene.

Example X

Purge a 250 cc. round-bottomed flask with nitrogen, charge 1 gram of finely-divided mercuric chloride and a solution of 0.5 gram of aluminum bromide in 100 cc. of trichloroethylene to the flask, and then add 9 grams of styrene. Conduct the polymerization in a nitrogen atmosphere with mechanical agitation at 0° C. for 2 hours and then at 45° C. for 30 minutes. Work up the polymer in the usual way.

The product is 7.5 grams of a hard polystyrene which begins to soften at 105° C.

The invention is a method of preparing a solid polymer by polymerizing a monomer of the group consisting of ethylene, propylene, butadiene, styrene, and mixtures thereof under mild polymerization conditions in contact with an aluminum halide/inorganic mercuric compound catalyst in an inert liquid medium.

The aluminum halide component of the catalyst is aluminum bromide and/or aluminum chloride; the inorganic mercuric component is a compound capable of forming some sort of loose complex with the aluminum halide, e.g., mercuric chloride, mercuric bromide, mercuric cyanide, mercuric nitrate, mercuric oxide, or mixtures thereof. The aluminum halide/mercuric component mol ratio can vary from 2:1 to 1:20 and is usually in the range of 2:1 to 1:2. Excellent results are obtained when the catalyst components are employed in equimolar amounts.

The catalyst can, if desired, be supported on an inert carrier such as charcoal or silica gel. The supported catalyst can be prepared by any suitable means, e.g., by impregnating the carrier with a solution of the catalyst components and then drying or (when the mercuric component is insoluble in the liquid medium) by impregnating the carrier with the mercuric component and then adding a solution of the aluminum component in the liquid medium. In both the supported and the unsupported catalyst systems, the aluminum halide is withdrawn from solution and adsorbed by the mercuric component.

The inert liquid medium of the reaction mixture must remain substantially unattacked by the catalyst during the polymerization reaction in order to prevent the catalysis of side-reactions by a catalyst-medium reaction product. Liquids qualified for use in the invention because of their inertness to the catalyst are: (1) n-alkanes, e.g., n-hexane, n-heptane, n-decane, n-dodecane, etc., (2) cycloalkanes, such as cyclohexane, (3) haloalkanes, e.g., carbon tetrachloride, chloroform, ethylene dibromide, etc., (4) haloalkenes, e.g., trichloroethylene, tetrachloroethylene, etc., and (5) liquid inorganic halides, such as stannic tetrachloride, silicon tetrachloride, etc. These liquids should, of course, be free of substantial amounts of impurities like branched-chain alkanes which would react with the catalyst.

The catalyst-liquid medium system can be homogeneous or heterogeneous. It is usually preferable to employ a heterogeneous system consisting of finely-divided catalyst in a chlorinated liquid, such as trichloroethylene, or in a saturated aliphatic hydrocarbon, such as cyclohexane.

The high activity of the catalyst permits the use of mild polymerization conditions in conducting the process of the invention. The polymerization temperature can vary from about 15–100° C.; temperatures of at least 50° C. usually give better results when a more linear polymer is desired. The pressure can vary from 1 to about 300 atmospheres and is advantageously in the range of 1–50 atmospheres.

The process of the invention is preferably conducted under anhydrous conditions because of the adverse effect of water on the catalyst, but small amounts of water can be tolerated. The presence of small amounts of oxygen, e.g., in the form of air, does not appear to affect the course of the polymerization.

Typically, the process of the invention is conducted by mixing the catalyst components with the liquid medium under anhydrous conditions, adding the monomer in any suitable manner (e.g., by passing in the dry ethylenically-unsaturated hydrocarbon in gas or vapor form) and preferably agitating the system while polymerization is taking place. The polymer can be recovered by washing the product with a solvent for the catalyst, e.g., water, hydrochloric acid, ethanol, or mixtures thereof, filtering off the polymer, and drying.

A particular advantage of the invention is that it permits the use of mild polymerization conditions for the process without requiring the use of uneconomical catalyst systems. Although it is also applicable to the preparation of solid polystyrene, solid polybutadiene, solid butadiene-styrene copolymers, and solid ethylene-propylene copolymers, the invention is particularly valuable for the production of solid polyethylenes and solid polypropylenes. The process is capable of yielding polyethylenes having a wide range of physical properties, including medium-density polyethylenes having densities between 0.920 and 0.935 at 22° C. and high-density polyethylenes having densities above 0.935 (e.g., 0.95–0.98) at 22° C. These high-density polyethylenes, as is already known, are very linear in character and begin to approach polymethylenes in some properties.

It is obvious that many variations can be made in the products and processes set forth above without departing from the spirit and scope of this invention.

What is claimed is:

1. In a process for polymerizing a monomer of the group consisting of ethylene, propylene, butadiene, styrene, and mixtures thereof at 15–100° C. under a pressure of 1–300 atmospheres, the improvement which comprises polymerizing said monomer to produce a solid polymer by conducting the polymerization in an inert liquid medium in contact with a catalyst consisting of (a) an aluminum halide component of the group consisting of aluminum chloride, aluminum bromide, and mixtures thereof and (b) 0.5–20 mols, per mol of the aluminum halide component, of a mercuric component of the group consisting of mercuric chloride, mercuric bromide, mercuric cyanide, mercuric nitrate, mercuric oxide, and mixtures thereof.

2. A process as in claim 1 wherein the inert liquid medium is a liquid of the group consisting of an n-alkane, a cycloalkane, a haloalkane, a haloalkene, and an inorganic halide.

3. A process as in claim 1 wherein the inert liquid medium is cyclohexane.

4. A process as in claim 1 wherein the inert liquid medium is n-decane.

5. A process as in claim 1 wherein the inert liquid medium is carbon tetrachloride.

6. A process as in claim 1 wherein the inert liquid medium is trichloroethylene.

7. A process as in claim 1 wherein the inert liquid medium is stannic tetrachloride.

8. A process as in claim 1 wherein the aluminum halide is aluminum bromide.

9. In a process for polymerizing ethylene at 15–100° C. under a pressure of 1–300 atmospheres, the improvement which comprises polymerizing said monomer to produce a solid polymer by conducting the polymerization in a cyclohexane medium in contact with a catalyst consisting of aluminum bromide and mercuric chloride, the aluminum bromide/mercuric chloride mol ratio being in the range of 2:1 to 1:20.

10. In a process for polymerizing ethylene at 15–100° C. under a pressure of 1–300 atmospheres, the improvement which comprises polymerizing said monomer to produce a solid polymer by conducting the polymerization in a cyclohexane medium in contact with a catalyst consisting of aluminum bromide and mercuric bromide, the aluminum bromide/mercuric bromide mol ratio being in the range of 2:1 to 1:20.

References Cited in the file of this patent

UNITED STATES PATENTS 2,085,535　　Langedijk et al. _____ June 29, 1937